UNITED STATES PATENT OFFICE.

DAVID SPENCE AND WILLIAM F. RUSSELL, OF AKRON, OHIO, ASSIGNORS, BY MESNE ASSIGNMENTS, TO THE B. F. GOODRICH COMPANY, OF NEW YORK, N. Y., A CORPORATION OF NEW YORK.

PROCESS FOR THE IMPROVEMENT OF INFERIOR-GRADE RUBBERS.

1,112,938.  Specification of Letters Patent.  Patented Oct. 6, 1914.

No Drawing.   Application filed February 12, 1912.  Serial No. 677,243.

*To all whom it may concern:*

Be it known that we, DAVID SPENCE and WILLIAM F. RUSSELL, both subjects of the King of Great Britain, and residing at Akron, in the county of Summit and State of Ohio, have invented a new and useful Process for the Improvement of Inferior-Grade Rubbers, of which the following is a specification.

This invention relates to a process for the improvement of inferior grade caoutchouc or the true rubber-substance of india rubber as distinct from the resinous and other impurities or by-products of india rubber.

The process is applicable, therefore, to the treatment of such rubbers as contain caoutchouc or true rubber substance of inferior quality, and is particularly applicable to the treatment of so-called "tacky" rubbers.

This process has for its object the conversion or change of all such inferior grade rubbers into rubbers having improved physical properties which can be readily handled and utilized in manufacturing processes, giving products of enhanced value. Such low grade rubbers as contain caoutchouc or true rubber-substance of inferior quality are well known, as distinct from such inferior grade rubbers as owe their inferiority solely to the fact that the true rubber substance in them is small in amount or is oxidized or perished. Such inferior grade rubbers occur in large quantities as the result of deterioration, spontaneous or induced. They are also a constant product of many industrial operations, and the process hereinafter described is not confined to the treatment of true rubber-substance or caoutchouc of any particular origin, and is applicable as well to the treatment of crude rubber occurring as a product from industrial processes as to the regeneration of products obtained by the treatment of vulcanized rubber waste. We have discovered that when such inferior grade rubbers are treated with alkali metals or alloys, or with alkaline derivatives thereof, or mixtures of the same, under suitable conditions, they are converted into tough, elastic products having the properties of high grade rubbers. Any metal of the sodium group may be used in carrying out this invention; thus metallic potassium, or the alloy of sodium and potassium, or mixtures thereof, may be substituted for metallic sodium, but for practical purposes we believe sodium to be most suitable. We do not, however, limit this process to the metals of the sodium group, as we find that the alkaline derivatives of the alkali metals, or mixtures of the same, may be used in place of the metals themselves. For example, caustic soda or potash, or sodium ethylate, may be substituted for the metals themselves. Other alkaline derivatives of alkali metals may be similarly employed. The results, however, are not so marked as they are where the metals themselves are used, and in practice we prefer to use the metals. The aforesaid substances may be directly incorporated with the rubber on the mixing mill, or mixed herewith in solution in any suitable solvent, or applied by any convenient means whereby they are disseminated as uniformly as possible throughout the mass to be treated. Experiment has shown that five per cent. of metallic sodium, or its equivalent in other metals or in their derivatives, calculated on the weight of the rubber to be treated, produces good results. We do not, however, limit this invention to this proportion of metallic substance, or substances, or derivatives thereof, for we have found by varying the proportion used that it is possible to obtain a wide range of improved products, and that, therefore, the amount of the substances that may be used may be varied within wide limits according to the nature of the product to be treated. Furthermore, we have found that the increment of improvement of the products of this process is to a large extent proportional to the diminished quality or degree of inferiority of the caoutchouc or true rubber-substance treated.

Generally speaking, temperatures between fifty to one hundred degrees centigrade are the most suitable for practical purposes, and the higher the temperature between air temperature and one hundred degrees centigrade the more rapidly the change takes place. For example, in mixing the substance, or substances, with the rubber on the mixing mill, it is preferable to have the rolls of the mill warmed to a temperature of from sixty to seventy degrees centigrade. We do not, however, limit ourselves to any temperature, or range of temperature, or to any time of treatment, as the temperature at which this process may be carried out may be varied within wide limits. Further, it is preferable that this process be carried out with technically dry or absolutely dry material, and may be carried out either in air or in the absence of air. As examples of the specific application of this process, the following are given:

First. One hundred parts of low grade rubber containing by analysis five to six per cent. of acetone-soluble impurities are mixed on the rolls of the mixing mill, which is maintained about sixty to seventy degrees centigrade with five parts of metallic sodium. In the course of several minutes the mass begins to harden and gradually becomes converted into a very tough product resembling high grade rubber which no longer adheres to the rolls of the mill or offers any difficulty in handling. The product can now be sheeted out to any form on the mill, and when the metallic sodium is uniformly distributed is set aside to incubate in a suitable receptacle for twenty-four hours and at a temperature of about sixty degrees centigrade. The metal is afterward removed by any suitable method.

Second. One hundred parts of inferior grade "tacky" Pontianak rubber containing twenty per cent. of acetone-soluble products are mixed on the warm rolls of the mixing mill with eight and one-half parts of powdered fused sodium hydroxid, or with fifteen parts of powdered sodium ethylate. (All by weight). A rapid toughening of the rubber takes place and the at first soft, sticky mass is quickly converted into a hard, tenacious product of high grade quality which can be readily handled. To complete the change it is well, after mixing on the mill, to continue the heating of the mix in a closed vessel to about sixty degrees centigrade for forty-eight hours. The alkali can be afterward removed by washing, or in any other convenient way.

Third. One hundred parts by weight of low grade "tacky" rubber are made into a homogeneous solution in seven hundred and fifty parts by weight of xylol, and to this solution five parts of metallic sodium are added. The solution is heated to one hundred degrees centigrade in an autoclave, while vigorous agitation is introduced in order to distribute the molten metal uniformly throughout the mass. The temperature of the mix is maintained about one hundred degrees centigrade for twenty-four hours, when it will be found that the original solution is converted into a solid gelatinous mass. From this mass the solvent and free alkali can be removed by evaporation *in vacuo* and washing, or by extraction, or by any other convenient means, when the rubber will be found to be converted into a very tough, elastic product of high grade quality.

We do not, however, limit this invention to the treatment of such inferior grade rubbers as those described in the above examples. We have found, for example, that the amount of acetone-soluble, resinous products present with the inferior grade rubber-substance may vary within wide limits without materially affecting the success of this process. In the case of highly resinous rubbers, however, we have found it best in practice to deresinate the product before treatment.

The products obtained by this invention are high grade rubbers, differing from their parent substances by their toughness and by the ease with which they can be handled on the mill. They have the remarkable property of dissolving only with difficulty and with much less ease than their parent substances in the ordinary solvents for india rubber. They vulcanize readily and give products of enhanced value.

Having thus fully described our invention, what we claim as new and desire to secure by Letters Patent of the United States is:

1. The process for the improvement of inferior grade rubber consisting in the treatment of the same with an alkaline element, in the absence of moisture.

2. The process for the improvement of inferior grade rubber consisting in the treatment of the same with an alkali metal or an alkaline derivative thereof, in the absence of moisture.

3. The process for the improvement of inferior grade rubber consisting in the treatment of the same with an alkali metal, alloy, mixture, or with an alkaline derivative or derivatives thereof, in the absence of moisture.

4. The process for the improvement of inferior grade rubber consisting in the treatment of the same with metallic sodium, in the absence of moisture.

In witness whereof, we affix our signatures in the presence of two witnesses.

DAVID SPENCE.
WILLIAM F. RUSSELL.

Witnesses:
  FRED. N. RICE,
  GUY M. COLLETTE.